(12) United States Patent
McKenzie et al.

(10) Patent No.: US 7,789,795 B2
(45) Date of Patent: Sep. 7, 2010

(54) METHOD FOR CONTROLLING A VEHICLE POWERTRAIN HAVING STEP RATIO GEARING AND A CONTINUOUSLY VARIABLE TRANSMISSION TO ACHIEVE OPTIMUM ENGINE FUEL ECONOMY

(75) Inventors: Ian Daniel McKenzie, Kalamazoo, MI (US); Craig Steven Jacobs, Canton, MI (US)

(73) Assignee: Eaton Corporation, Cleveland, OH (US)

( * ) Notice: Subject to any disclaimer, the term of this patent is extended or adjusted under 35 U.S.C. 154(b) by 506 days.

(21) Appl. No.: 11/975,005

(22) Filed: Oct. 17, 2007

(65) Prior Publication Data

US 2009/0105041 A1 Apr. 23, 2009

(51) Int. Cl.
*B60W 10/04* (2006.01)
(52) U.S. Cl. .......................... 477/41; 477/115
(58) Field of Classification Search .................... 477/41
See application file for complete search history.

(56) References Cited

U.S. PATENT DOCUMENTS

| | | | |
|---|---|---|---|
| 4,458,561 A | 7/1984 | Frank | |
| 4,682,511 A | 7/1987 | Wittke | |
| 4,699,025 A | 10/1987 | Omitsu | |
| 4,936,165 A | 6/1990 | Doyle et al. | |
| 5,055,094 A | 10/1991 | Cataldo | |
| 5,643,121 A | 7/1997 | Greenwood et al. | |
| 5,669,846 A | 9/1997 | Moroto et al. | |
| 5,911,771 A | 6/1999 | Reichart et al. | |
| 5,980,414 A | 11/1999 | Larkin | |
| 6,056,657 A | 5/2000 | Garnett | |
| 6,056,661 A | 5/2000 | Schmidt | |
| 6,098,022 A | 8/2000 | Sonnichsen et al. | |
| 6,285,941 B1 | 9/2001 | Janecke | |
| 6,402,660 B1 | 6/2002 | Cronin et al. | |
| 6,447,422 B1 | 9/2002 | Haka | |
| 6,459,978 B2 | 10/2002 | Taniguchi et al. | |
| 6,496,767 B1 * | 12/2002 | Lorentz | 701/55 |
| 6,658,338 B2 | 12/2003 | Joe et al. | |
| 6,721,643 B1 | 4/2004 | Hanggi et al. | |
| 6,852,055 B2 | 2/2005 | Kmicikiewicz | |
| 6,859,709 B2 | 2/2005 | Joe et al. | |
| 6,882,909 B2 | 4/2005 | Lee | |
| 6,909,953 B2 | 6/2005 | Joe et al. | |

(Continued)

FOREIGN PATENT DOCUMENTS

DE 101 44 943 A1 5/2002

(Continued)

OTHER PUBLICATIONS

International Search Report for PCT/IB2008/002743 dated Feb. 26, 2009.

*Primary Examiner*—Roger L Pang
*Assistant Examiner*—Justin Holmes
(74) *Attorney, Agent, or Firm*—Brooks Kushman P.C.

(57) ABSTRACT

A method is disclosed for controlling overall transmission ratios in a vehicle powertrain with an engine, fixed multiple-ratio gearing and infinitely variable ratio components. For a given vehicle speed and for a given vehicle traction wheel horsepower, the fixed multiple-ratio gearing and the infinitely variable ratio components are controlled to operate with an overall ratio that will permit the engine to operate with optimum efficiency.

6 Claims, 4 Drawing Sheets

U.S. PATENT DOCUMENTS

| | | |
|---|---|---|
| 6,986,725 B2 | 1/2006 | Morscheck |
| 7,217,214 B2 * | 5/2007 | Morscheck ................. 475/211 |
| 7,473,202 B2 * | 1/2009 | Morscheck et al. ......... 475/208 |
| 2004/0127321 A1 | 7/2004 | Morscheck |
| 2005/0054469 A1 | 3/2005 | Dyck et al. |
| 2005/0215393 A1 | 9/2005 | Shimoda |

FOREIGN PATENT DOCUMENTS

| | | |
|---|---|---|
| EP | 1386775 A | 2/2004 |
| GB | 2091358 A | 7/1982 |

* cited by examiner

|  | TORQUE (Lb.-ft.) → | | | |
|---|---|---|---|---|
| GEAR, CVT | ~ | ~ | ~ | ~ |
| ~ | ~ | ~ | GEAR, CVT | ~ |
| ~ | GEAR, CVT | ~ | ~ | GEAR, CVT |
| ~ | ~ | ~ | ~ | ~ |
| ~ | ~ | GEAR, CVT | ~ | ~ |
| GEAR, CVT | ~ | ~ | ~ | ~ |
| ~ | ~ | ~ | GEAR, CVT | ~ |

TRANSMISSION RATIO N input/N output

METHOD FOR CONTROLLING A VEHICLE POWERTRAIN HAVING STEP RATIO GEARING AND A CONTINUOUSLY VARIABLE TRANSMISSION TO ACHIEVE OPTIMUM ENGINE FUEL ECONOMY

BACKGROUND OF THE INVENTION

1. Field of the Invention

The invention relates to the control of a transmission in a vehicle powertrain having a step ratio power flow path and an infinitely variable ratio power flow path.

2. Background Art

An example of a vehicle powertrain having fixed ratio gearing and continuously variable torque delivery features is disclosed in U.S. Patent publication US2004/0127321, published Jul. 1, 2004. Another example is disclosed in co-pending U.S. patent application Ser. No. 11/318,656, filed Dec. 27, 2005. The patent application corresponding to this patent application publication and the co-pending '656 patent application are assigned to the assignee of the present invention. The disclosures are both incorporated herein by reference and complement the present disclosure.

A typical step ratio transmission in a vehicle powertrain will allow a limited number of engine speeds for a given output shaft speed. The number of engine speeds that are available depends upon the number of gear ratios, which are fixed by a design choice. In contrast, a transmission of the type disclosed in the aforementioned earlier disclosures will allow a large number of engine speeds for a given output shaft speed due to the infinitely variable ratio feature.

A control strategy for achieving an optimum engine speed for maximum engine efficiency for a conventional step ratio transmission is not adaptable to a control strategy for achieving optimum engine speed for a given output shaft speed for an infinitely variable transmission. A transmission having infinitely variable characteristics as well as step ratio gearing, therefore, requires a more complex control strategy to optimize engine speed for maximum efficiency. Provision of such a control strategy is an objective of the invention.

SUMMARY OF THE INVENTION

The present invention comprises a method to achieve steady-state engine speed optimization for maximum engine efficiency in a transmission having a section with fixed, multiple ratio gearing and a section with infinitely variable ratio characteristics wherein power flow from the engine to a power output shaft has a divided power flow path. For a given output shaft speed and a given output shaft horsepower, the strategy of the present invention will set the engine speed so that the engine efficiency is at or near a maximum value. For a given output shaft horsepower, the engine will consume a least amount of fuel for a unit of time. The strategy will adjust the engine speed by controlling the ratio of the infinitely variable transmission section. Hereinafter, the infinitely variable transmission section will be referred to as a "variator."

Overall powertrain efficiency is affected by transmission efficiency and engine efficiency. Transmission efficiency for a fixed ratio transmission is high and substantially unchanged throughout a given engine speed range. Therefore, its effect on optimization of fuel consumption essentially can be ignored. In the case of the transmission of the present invention, however, transmission efficiency cannot be ignored since it is a complex function of engine shaft speed, engine input shaft torque, gear ratio of step ratio gearing and variator ratio. Engine efficiency for a given engine in a group of engines of similar design also may vary.

The invention comprises a method that includes the step of analyzing an engine efficiency map, created off-line, that quantifies a relationship between engine power and engine speed and the effect of these variables on fuel consumption for any given engine speed and engine power. This data can be recorded in a table stored in a ROM portion of a microprocessor controller for the engine. A relationship then is developed between road speed and overall powertrain efficiency for each gear ratio of the step ratio transmission. Each value of horsepower at the power output shaft for the transmission and the corresponding engine speed are data used as variables in the development of a look-up table from which overall powertrain operating efficiency can be determined. The best overall operating efficiency then can be correlated with an engine speed. Using that information and using output shaft speed information from a conventional speed sensor, a transmission ratio can be determined. A torque demand by the operator, which can be determined based upon engine speed and horsepower demand by the driver, together with variator input speed, can be used to determine the correct gear ratio of the fixed ratio gearing and the variator ratio that together will cause the overall powertrain efficiency to be at an optimum value.

Frequent ratio changes at the variator, which usually is referred to as variator slew, can be minimized by determining maximum and minimum values for the variator ratio that will achieve optimum overall powertrain efficiency. The maximum and minimum variator ratios are calibrated operating range ratios for the variator that will result in minimal overall powertrain efficiency change. This feature avoids undesirable hunting of the engine speed above and below the best engine speed for optimum efficiency while reducing frequency of variator slew.

PARTICULAR DESCRIPTION OF AN EMBODIMENT OF THE INVENTION

Figure 1:
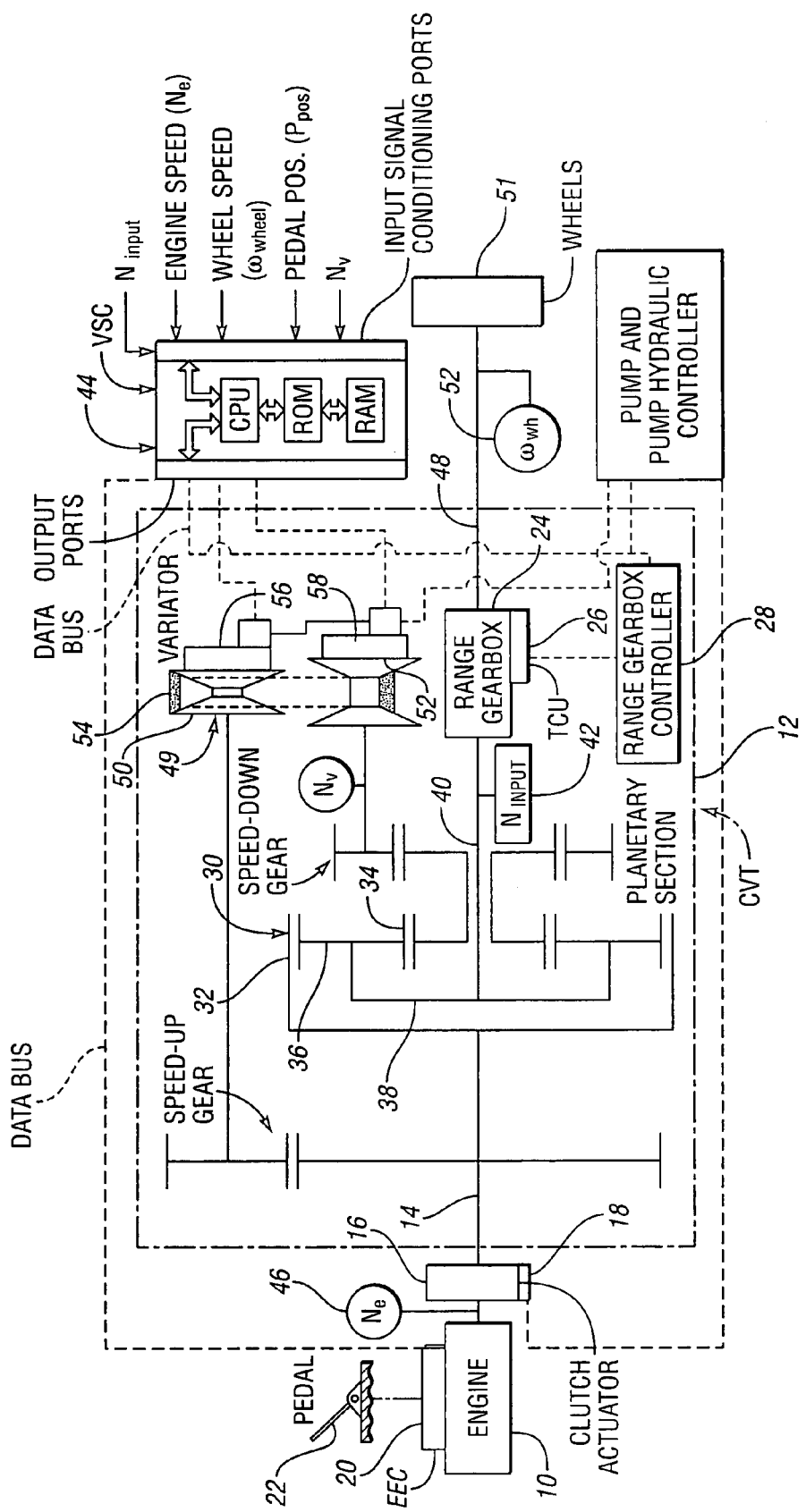
FIG. 1 is a schematic representation of a vehicle powertrain with step ratio gearing and with a variator that define separate power flow paths from an engine to traction wheels for the vehicle.

An example of a vehicle powertrain with a step ratio transmission and a variator with continuously variable ratio characteristics is illustrated in FIG. 1. Other variator designs could be used with transmissions of this type, including fluid pump and motor variators using hydraulic components with variable displacement and toroidal driving and driven disks. The variator disclosed in FIG. 1 is a continuously variable driving and driven sheave design with a chain or a belt drivably connecting the sheaves.

Another example of a powertrain that can embody the present invention is described in U.S. Patent Publication US-2004/0127321, published Jul. 1, 2004. Still another example is disclosed in co-pending U.S. patent application Ser. No. 11/318,656, filed Dec. 27, 2005.

The powertrain engine is shown in FIG. 1 at 10. The continuously variable portion, or variator, shown at 12 has a power input shaft 14 that is connected drivably to the engine 10 through speed-up gearing. A clutch actuator 18, under the control of the vehicle driver, selectively engages and disengages clutch 16. The engine 10 is controlled by an electronic engine controller 20, which receives a driver power demand from an accelerator pedal position sensor 22.

A multiple-speed transmission and range gearing is diagrammatically shown at 24. A transmission control unit 26 is electronically coupled to a range gearbox controller 28.

A planetary gear unit 30, sometimes referred to as a power mixer, includes a ring gear 32 connected drivably to power input shaft 14. A sun gear 34 for planetary gear unit 30 engages planet pinions 36 supported on a carrier 38, which is drivably connected to range gearbox input shaft 40. An input shaft speed sensor 42 develops a speed signal that is distributed to a vehicle system controller 44. Likewise, an engine speed sensor 46 develops an engine speed signal that is distributed to the vehicle system controller 44.

The planetary gearing shown at 30 in FIG. 1 is a power split device that establishes two power flow paths for the transmission. The output power is received by shaft 40, which is connected to carrier 38. The output power is a function of ring gear torque and sun gear torque. Part of the engine power goes through the variator and the balance of the engine power goes to the ring gear. The torque values, of course, are a function of the variator ratio.

The carrier torque is equal to:

$$T_{carrier} = X \cdot T_{ring} + Y \cdot T_{sun}, \text{ where}$$

$$X + Y = 1,$$

$$X = \frac{\text{Number of teeth in ring gear } (N_{ring})}{N_{ring} + \text{Number of teeth in sun gear } (N_{sun})}, \text{ and}$$

$$Y = \frac{N_{sun}}{N_{ring} + N_{sun}}$$

Although a specific planetary gear arrangement is disclosed, other split torque or power mixer gear arrangements could be used. Such gear arrangements would not include a torque reaction element. They would function as power dividers.

A power output shaft 48 for the range gear box 24 is drivably connected in the usual fashion to vehicle traction wheels 51. The speed of the power output shaft 48, which is a measure of vehicle speed, is measured by a wheel speed sensor 52 and distributed to the vehicle system controller 44. Other powertrain variables also are distributed to the vehicle system controller, including the previously described pedal position sensor signal output at 22.

A variator assembly with adjustable sheaves is shown at 49. Power input adjustable sheave 50 and power output adjustable sheave 52 are drivably connected by a belt or chain 54. Power output sheave 52 is connected to sun gear 34 through speed-down gearing. The effective pitch diameter of the sheave 50 can be varied by a sheave actuator 56, and the effective pitch diameter of adjustable sheave 52 can be adjusted by sheave actuator 58. Both sheave actuators are under the control of a hydraulic pump and pump hydraulic controller. As the spacing between the disks of the sheave 50 is decreased, a simultaneous increase occurs in the effective pitch diameter of sheave 52, and vice versa.

The vehicle system controller has input signal conditioning ports that receive control signals, including variator input speed ($N_v$), pedal position sensor input ($P_{pos}$), wheel speed ($\omega_{wheel}$), engine speed ($N_e$) and transmission input speed ($N_{input}$). A ROM memory portion stores data of the kind shown in FIGS. 2, 3, 4 and 6, which will be described subsequently. The vehicle system controller includes also a memory RAM portion, which receives the input signal conditioning port information. Both memory portions are in electronic communication with a central processor unit (CPU), which executes the data in accordance with a control algorithm stored in ROM. The CPU output is received by the output ports and transmitted through data links and a data bus to the overall powertrain components, as illustrated schematically by the dotted signal flow paths in FIG. 1.

Figure 2:
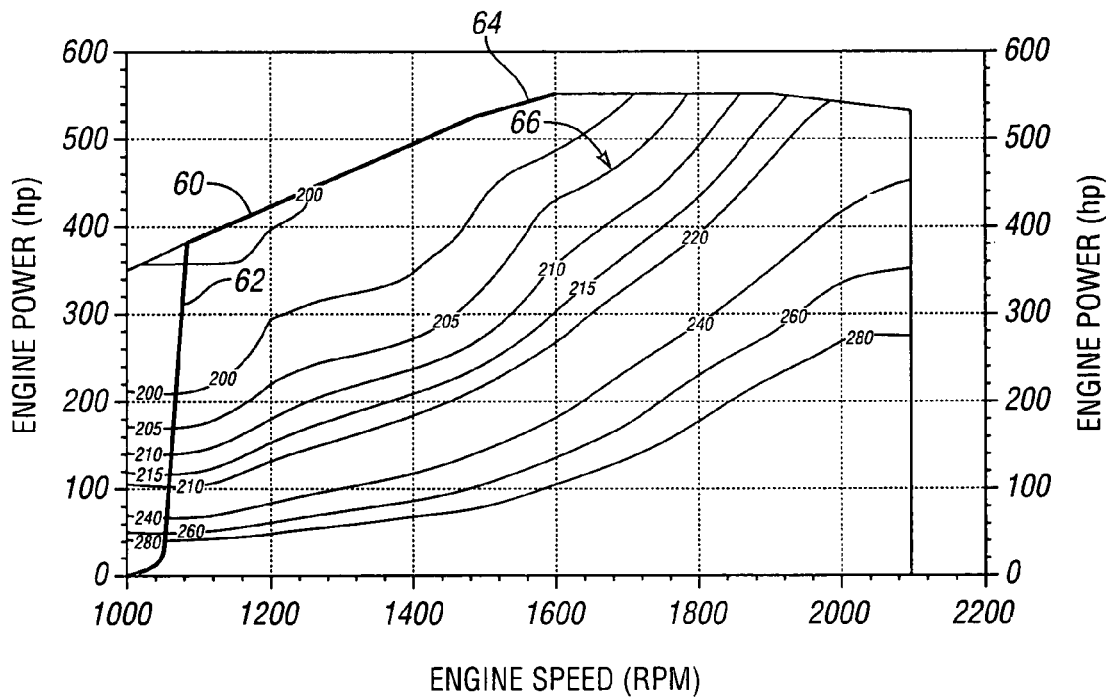
FIG. 2 is a performance plot for a typical internal combustion engine, which shows the relationship between engine speed and engine power, together with efficiency plots for representative efficiency values.

FIG. 2 is a typical plot for an internal combustion engine that can be developed off-line using a precalibration procedure. It shows the relationship between engine speed and engine power.

The most efficient engine speed for a given engine power is illustrated in FIG. 2 by the heavy line 60. The generally vertical portion 62 illustrates the relationship between engine power at speeds near the engine idle speed. As engine power increases, the engine speed for optimum efficiency increases in a relatively uniform fashion until a maximum power is reached at about 550 HP, as shown at 64.

The family of lines identified generally by reference numeral 66 represent constant efficiency lines for various values of engine power and engine speed. If engine speed for any given engine power should increase from a value different than the value represented by line 60, the engine will operate at efficiency levels that progressively decrease. For example, if the engine power is 400 HP and the engine speed should increase to about 1650 RPM, the engine operating efficiency would be approximately 205 grams per HP per second. The efficiency would decrease progressively as the engine speed increases for a given engine power. In creating the plot of FIG. 2, engine RPM values are used between an engine idle speed, such as 600 RPM and a rated speed, such as 2100 RPM.

Figure 3:
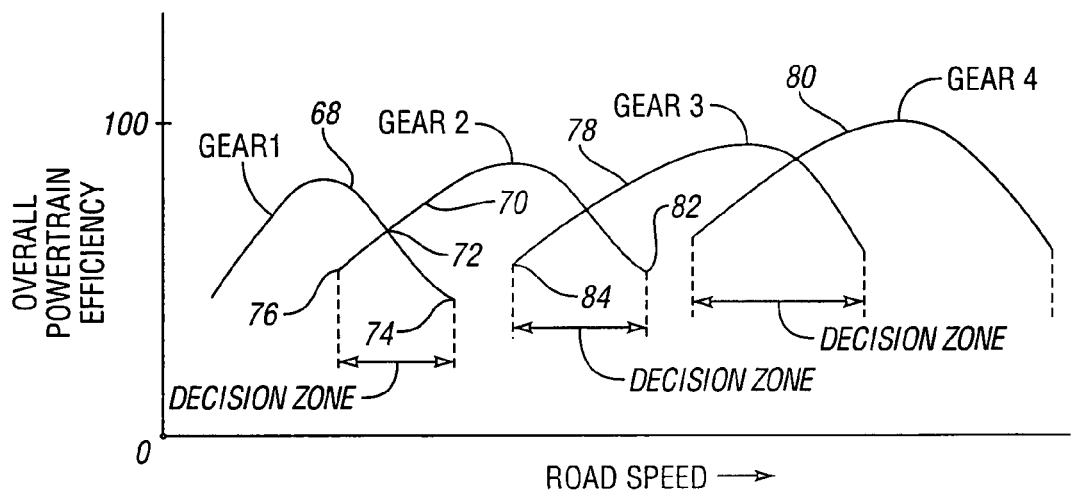
FIG. 3 is a plot showing road speed for various overall powertrain efficiencies, each transmission gear ratio being represented by a separate plot.

The plot of FIG. 3 uses data shown in FIG. 1 to determine the overall operating powertrain efficiency for various road speeds and for each transmission gear ratio. In obtaining the data for FIG. 3, the output shaft RPM is varied, the variator ratio is varied from a minimum underdrive ratio to a maximum overdrive ratio, and the engine speed is varied from a point below engine idle speed (600 RPM) to a rated speed (2100 RPM). The engine horsepower required to generate the required output shaft horsepower is calculated taking into account the transmission efficiency at a given operating point. The fuel consumed by the engine at each operating point then is determined. The map of FIG. 2 demonstrates that there will be several operating points for various output shaft speeds and a given output shaft horsepower, as demonstrated by a relative flatness in the optimum efficiency plot. This range of engine speeds at the minimum fuel consumption points can be used to provide a basis for establishing minimum and maximum desired variator ratios for a given set of operating conditions.

A determination of a range of variator ratios at which optimum efficiency can be achieved, rather than a single target variator ratio, will reduce the amount of variator slewing. The reduction in the slewing of the variator under load then contributes to a transient fuel efficiency improvement.

As shown in FIG. 3, each transmission gear ratio has a separate overall powertrain efficiency and road speed relationship. The relationship for the transmission first gear is shown at 68, and the corresponding relationship for second gear is shown at 70. There is a zone to the left of the intersection point 72 where the overall powertrain efficiency for a given road speed overlaps for first gear operation and second gear operation. The same is true for the zone located to the right of point 72. The end point for the plot for first gear is shown at 74 and the beginning point for the plot for second gear is shown at 76. The area between points 74 and 76 is indicated to be a so-called decision zone in which the controller will effect a ratio change from the first gear to the second gear before the crossover point 72 is reached as road speed increases. Similarly, if the transmission is in second gear and road speed should decrease, a decision will be made in the decision zone near the crossover point 72 to change the transmission ratio to the first gear.

Plots corresponding to plots 68 and 70 are made also for third gear and fourth gear, as shown at 78 and 80, respectively. A decision zone between end points 82 and 84 of the plots for second gear and third gear is provided, as in the case of the decision zone between points 74 and 76. A decision zone for second gear and third gear includes a wider range of road speeds than in the case of the decision zone between points 74 and 76.

A decision zone corresponding to the plot for third gear and fourth gear also is provided. The road speeds included between the end points for the plots for third gear and fourth gear includes a still larger road speed spread than in the case of the decision zone for the plots for second gear and third gear.

At the decision zones illustrated in FIG. 3, the best combination of transmission ratio and variator ratio is calculated to avoid the hunting feature previously described. This involves using existing shift logic to predict a deceleration of the vehicle during a shift. Knowing this deceleration, the vehicle speed in the next gear, or the adjacent gear, can be calculated. Using this vehicle speed, the drivetrain efficiency is determined at the desired engine speed and at the actual vehicle speed in the current gear. This efficiency is a function of the power through each of a power flow paths through the drivetrain and the efficiency of the power flow through each of those paths at the given vehicle speed and engine power. Drivetrain efficiency is also calculated for the desired engine speed and for the predicted vehicle speed for both the higher gear and the lower gear. The powertrain efficiencies at those predicted vehicle speeds are compared. In the decision zone between each adjacent pair of gears, there will be both a decrease and an increase in the values of the efficiencies in each power flow path when (i) the powertrain stays in a given gear, (ii) an upshift is commanded, and (iii) a downshift is commanded. The shift decision that will be made is that shift that will result in the highest net improvement in powertrain efficiency. This procedure then is comparable to a typical cost/benefit analysis. The shift decision that is made is one that will result the most overall benefit.

Figures 6, 6A:
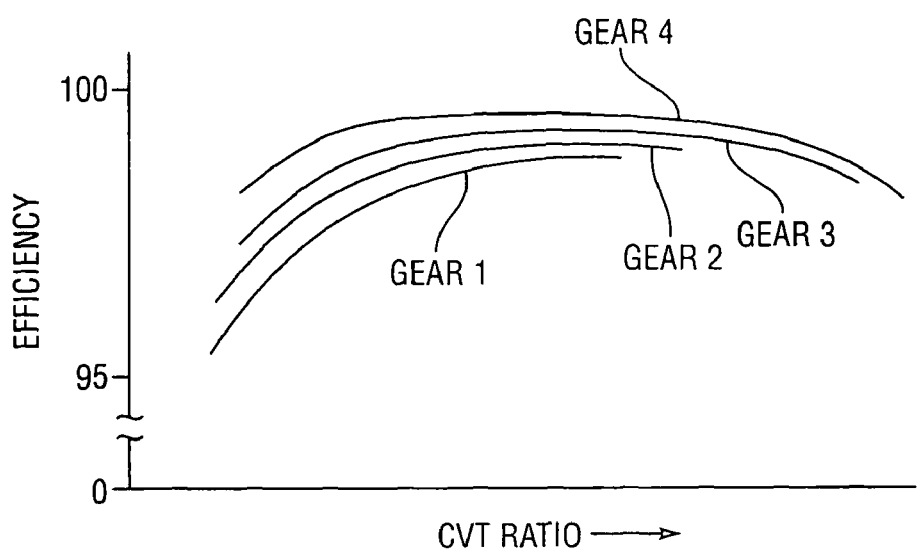
FIG. 6 is a table for storage in ROM memory, which is used to convert wheel torque demand and variator input speed for each overall transmission ratio to determine the step ratio gear and the variator ratio that will develop optimum powertrain efficiency.
FIG. 6a is a representative plot of variator ratios and corresponding overall efficiency for each of several gear ratios.

The efficiency of the engine depends upon the operating point for the engine and the characteristic engine torque and engine speed relationship. In a similar fashion, the efficiency of the variator portion of the power flow path will change as the variator ratio changes. There will be a characteristic efficiency and variator ratio characteristic for the powertrain for each gear ratio in the step ratio transmission. This is demonstrated in the plot of FIG. 6a. The profiles of the plots in FIG. 6a are relatively flat, which will help reduce frequency of "hunting" between adjacent overall ratios.

The plot of FIG. 3 is made for a given engine speed, such as 1300 RPM, and for a given engine torque, such as 400 pounds feet. A similar plot can be made for a different engine speed and a different engine torque such that there will be a set of curves showing road speed and overall powertrain efficiency for each of several selected engine speeds and engine torque values. This information is recorded in a table such as that shown in FIG. 4. For any given horsepower at the wheels and for any corresponding road speed selected from the plot of FIG. 3, there will be an engine speed with a corresponding optimum overall powertrain efficiency.

As indicated in the following table, various engine speeds will be associated with different efficiencies for a given wheel horsepower and road speed. The efficiencies corresponding to each engine speed selected in this fashion are indicated, by way of example, in this table. An engine speed between 1400 and 1500 RPM, in the example illustrated in the following table, is the best engine speed for optimum powertrain efficiency, expressed as grams of fuel per horsepower per second.

| Engine Speed (RPM) | Overall Efficiency (G/HP/S) |
| --- | --- |
| 1100 | 215 |
| 1200 | 210 |
| 1300 | 209 |
| 1400 | 205 |
| 1500 | 215 |
| 1600 | 230 |

Figures 4, 5:
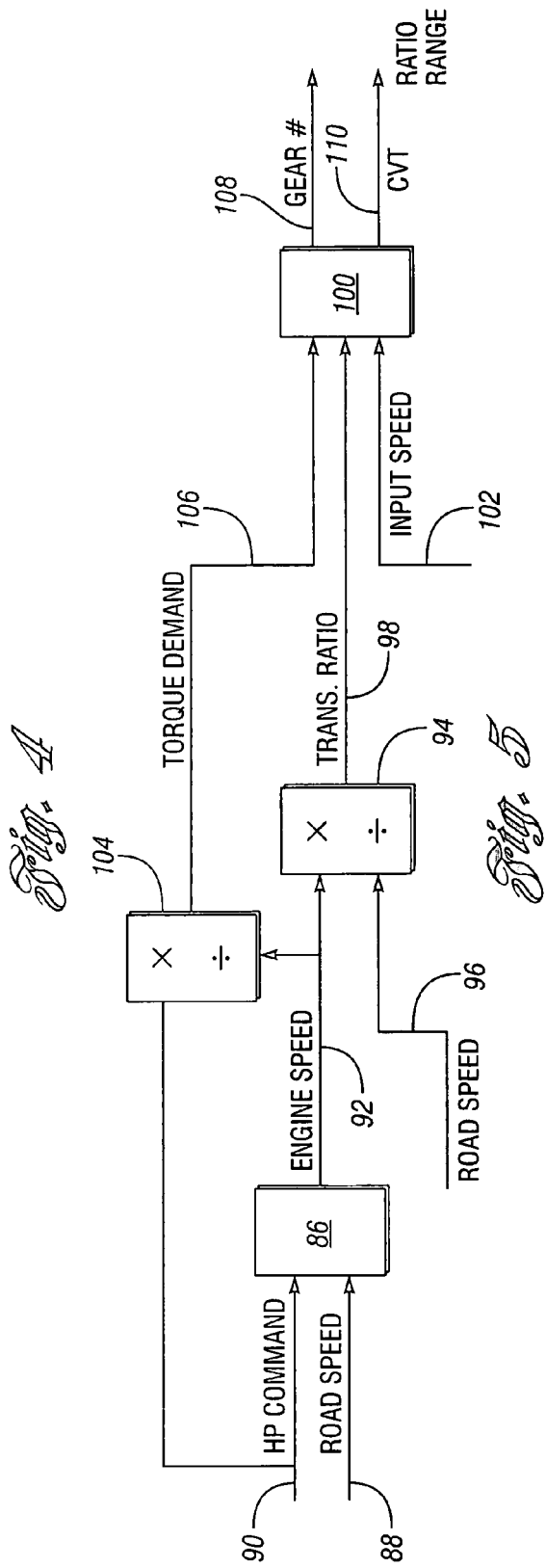
FIG. 4 is a table showing data of the type illustrated in FIG. 3 for various engine speeds, each engine speed being associated with a separate value for overall powertrain efficiency.
FIG. 5 is a block diagram that demonstrates the various steps that are executed by the control strategy of the invention.

FIG. 5 is a block diagram that illustrates the steps that are executed by the present control strategy. At action block 86 in FIG. 5, the RAM portion of the controller memory will receive road speed information, as indicated at 88, and driver horsepower demand, as indicated at 90. The information contained in the table of FIG. 4 is stored in ROM and used in action block 88 to develop an engine speed output 92. This road speed is distributed to a multiplier/divider action block 94, which receives also road speed information from an output shaft speed sensor, as shown at 96. The engine speed and the road speed are acted upon at block 94 to determine a transmission ratio, as shown at 98. The value for a transmission ratio is transferred to action block 100. This action block receives also variator input speed from a speed sensor for variator sheave 52. This speed value is shown at 102.

The engine speed at 92 is combined with driver horsepower command at 90 by a multiplier/divider action block 104 to develop a torque demand at the wheels, as shown at 106.

The information in action block 100 is the information indicated in the table of FIG. 6. For each torque demand at 106, there will be a transmission ratio, shown at 108, and a variator ratio, shown at 110, that will result in optimum engine speed.

As previously explained, there will be minimum variation in optimum efficiency when the variator ratio changes in a relatively flat region of the variator performance curve. Thus, the CVT ratio output at 110 is represented by maximum and minimum variator ratio values. It is only when the variator ratio values exceed or is less than the range of values indicated at 110 that the variator will slew from one position to another. This will reduce the frequency of movement of the variator sheaves as slight changes in torque demand occur. The frequency of the slewing of the variator could be reduced also by providing a minimum and a maximum engine speed at 92, rather than a single engine speed. This would be feasible if the engine speed falls on a relatively flat portion of the characteristic plot of engine speed and torque. In this fashion, a desirable so called hysteresis effect is introduced.

Although an embodiment of the invention has been disclosed, it will be apparent to persons skilled in the art that modifications may be made without departing from the scope of the invention. All such modifications and equivalents thereof are intended to be covered by the following claims.

What is claimed is:

1. A method for controlling a power transmission in a powertrain for a wheeled vehicle, the powertrain having an engine and the transmission having dual power delivery paths from the engine to vehicle traction wheels, one power delivery path being defined by multiple fixed-ratio gearing and the other power delivery path being defined by infinitely variable ratio elements;

the method comprising the steps of:
calibrating a first relationship of powertrain variables comprising engine speed and engine power that will achieve an optimum engine efficiency for a given engine power demand and for a given engine speed, the engine efficiency decreasing when engine speed increases for the given engine power;
calibrating a second relationship of powertrain variables comprising overall powertrain efficiency and vehicle speed for each of multiple gear ratios for the transmission;
determining horsepower at the traction wheels for each of several engine speeds using the calibrated first and second relationships of powertrain variables;
selecting an engine speed that corresponds to optimum engine efficiency; and
selecting a gear ratio and a ratio for the infinitely variable ratio elements for a given demand for power at the traction wheels whereby the engine operates at the selected engine speed.

2. The method set forth in claim 1 wherein the selection of a ratio for the infinitely variable ratio elements comprises selecting a range of ratios for the infinitely variable ratio elements, the overall powertrain ratio being relatively unchanged as the ratio of the infinitely variable ratio elements is a value within the range of ratios whereby hysteresis is introduced and transient adjustments of the infinitely variable ratio elements are reduced in frequency.

3. The method set forth in claim 1 wherein the step of selecting a gear ratio and a ratio for the infinitely variable ratio elements for a given demand for power at the traction wheels comprises predicting deceleration of the vehicle during a ratio shift;
calculating vehicle speed in a next gear relative to the current gear speed;
calculating driveline efficiency at a desired engine speed and at an actual vehicle speed for a current gear, the driveline efficiency being a function of power through the fixed-ratio gearing and through the infinitely variable ratio elements;
calculating powertrain efficiency for a desired engine speed and predicted vehicle speeds for adjacent gear ratios higher and lower than a current ratio;
determining powertrain efficiency for each adjacent gear ratio; and
selecting the gear ratio associated with each of the determined powertrain efficiencies that is highest.

4. The method set forth in claim 2 wherein the step of selecting a gear ratio and a ratio for the infinitely variable ratio elements for a given demand for power at the traction wheels comprises predicting deceleration of the vehicle during a ratio shift;
calculating vehicle speed in a next gear relative to the current gear speed;
calculating driveline efficiency at a desired engine speed and at an actual vehicle speed for a current gear, the driveline efficiency being a function of power through the fixed-ratio gearing and through the infinitely variable ratio elements;
calculating powertrain efficiency for a desired engine speed and predicted vehicle speeds for adjacent gear ratios higher and lower than a current ratio;
determining powertrain efficiency for each adjacent gear ratio; and
selecting the gear ratio associated with each of the determined powertrain efficiencies that is highest.

5. The method set forth in claim 3 wherein the step of calculating driveline efficiency is executed as a function of power through the fixed-ratio gearing and through the infinitely variable ratio elements as well as efficiencies of the fixed-ratio gearing and the infinitely variable ratio elements.

6. The method set forth in claim 1 wherein the step of selecting an engine speed comprises selecting minimum and maximum engine speeds in an engine speed range corresponding to minimal engine torque change whereby hysteresis is introduced to reduce frequency of transient adjustments of the infinitely variable ratio elements.

* * * * *